United States Patent
Haraden et al.

(10) Patent No.: US 9,710,878 B2
(45) Date of Patent: *Jul. 18, 2017

(54) LOW POWER DMA LABELING

(71) Applicant: MICROSOFT TECHNOLOGY LICENSING, LLC, Redmond, WA (US)

(72) Inventors: Ryan Scott Haraden, Duvall, WA (US); Matthew Ray Tubbs, Redmond, WA (US); Adam James Muff, Woodinville, WA (US); Robert Allen Shearer, Woodinville, WA (US)

(73) Assignee: MICROSOFT TECHNOLOY LICENSING, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/574,093

(22) Filed: Dec. 17, 2014

(65) Prior Publication Data

US 2016/0180493 A1 Jun. 23, 2016

(51) Int. Cl.
*G06T 1/60* (2006.01)
*H04N 13/00* (2006.01)
*G06T 1/20* (2006.01)

(52) U.S. Cl.
CPC .......... *G06T 1/60* (2013.01); *G06T 1/20* (2013.01); *H04N 13/0029* (2013.01); *G06T 2200/28* (2013.01)

(58) Field of Classification Search
CPC ......... G06T 1/60; G06T 1/20; H04N 13/0029; H04N 5/23229; G06K 9/0061; G06K 9/00

See application file for complete search history.

(56) References Cited

U.S. PATENT DOCUMENTS

| | | | |
|---|---|---|---|
| 5,526,040 A | 6/1996 | Foley | |
| 5,537,156 A * | 7/1996 | Katayama | G09G 5/393 345/547 |
| 5,673,422 A | 9/1997 | Kawai | |
| 5,760,794 A * | 6/1998 | Munson | G09G 5/393 345/522 |

(Continued)

OTHER PUBLICATIONS

Office Action dated Dec. 23, 2015, U.S. Appl. No. 14/574,100.

(Continued)

*Primary Examiner* — Jingge Wu
(74) *Attorney, Agent, or Firm* — Vierra Magen Marcus LLP

(57) ABSTRACT

Methods for preprocessing pixel data using a Direct Memory Access (DMA) engine during a data transfer of the pixel data from a first memory (e.g., a DRAM) to a second memory (e.g., a local cache) are described. The pixel data may derive from an image capturing device (e.g., a color camera or a depth camera) in which individual pixel values are not a multiple of eight bits. In some embodiments, the DMA engine may perform a variety of image processing operations on the pixel data prior to the pixel data being written into the second memory. In one example, the DMA engine may be configured to identify and label one or more pixels as being within a particular range of pixel values and/or the DMA engine may be configured to label pixels as belonging to one or more pixel groups based on their pixel values.

20 Claims, 10 Drawing Sheets

(56) References Cited

U.S. PATENT DOCUMENTS

| | | | |
|---|---|---|---|
| 5,949,966 A * | 9/1999 | Hayashi | H04N 1/4055 358/1.9 |
| 6,400,830 B1 | 6/2002 | Christian et al. | |
| 6,476,807 B1 | 11/2002 | Duluk | |
| 7,199,799 B2 | 4/2007 | Hutchins et al. | |
| 8,212,828 B2 | 7/2012 | Wells et al. | |
| 8,259,198 B2 | 9/2012 | Cote et al. | |
| 8,508,621 B2 | 8/2013 | Cote et al. | |
| 8,660,362 B2 | 2/2014 | Katz et al. | |
| 8,687,903 B1 | 4/2014 | Hernandez Esteban | |
| 8,965,140 B1 * | 2/2015 | Xu | G06K 9/38 382/195 |
| 2002/0131643 A1 * | 9/2002 | Fels | G06K 9/00 382/224 |
| 2003/0142058 A1 | 7/2003 | Maghielse | |
| 2003/0218069 A1 * | 11/2003 | Meier | G06K 7/10881 235/462.25 |
| 2005/0007407 A1 * | 1/2005 | Jauert | B41J 29/38 347/19 |
| 2006/0239394 A1 * | 10/2006 | Fujieda | G01N 23/04 378/1 |
| 2009/0073193 A1 | 3/2009 | Nagaraj | |
| 2009/0109207 A1 | 4/2009 | Nakamura | |
| 2009/0128857 A1 * | 5/2009 | Shiraishi | G06K 15/02 358/3.03 |
| 2009/0164666 A1 * | 6/2009 | Malina | G09G 3/346 709/246 |
| 2011/0102438 A1 | 5/2011 | Mathe | |
| 2011/0134125 A1 | 6/2011 | Chen | |
| 2011/0285873 A1 * | 11/2011 | Showering | G06K 9/228 348/231.99 |
| 2012/0265906 A1 * | 10/2012 | Carlson | G06F 9/4843 710/22 |
| 2013/0322762 A1 | 12/2013 | Zeng et al. | |
| 2014/0211979 A1 * | 7/2014 | Kawazu | G06T 1/0028 382/100 |
| 2016/0106387 A1 * | 4/2016 | Kahn | A61B 6/5211 378/62 |

OTHER PUBLICATIONS

Response to Office Action dated Mar. 24, 2016, U.S. Appl. No. 14/574,100.
"International Search Report and Written Opinion Issued in PCT Application No. PCT/US2015/063563", Mailed Date: Mar. 9, 2016.
"International Search Report and Written Opinion Issued in PCT Application No. PCT/US2015/063564", Mailed Date: Mar. 11, 2016, 14 Pages.
Sulzbachner, et al., "An embedded high performance data acquisition and pre-processing interface for asynchronous event-based Silicon Retina data", In Proceedings of International Conference on Mechatronic and Embedded Systems and Applications, Jul. 15, 2010, pp. 313-318.
Seiler, et al., "Integrating Video Rendering Into Graphics Accelerator Chips", In Proceedings of the Digital Technical Journal, vol. 7, No. 4, Jan. 1, 1995, pp. 76-88.
Heuring, et al., "Computer Systems Design and Architecture", Addison-Wesley, 1997, pp. 399-402.
Caselle, et al., "Ultra-Fast Streaming Camera Platform for Scientific Applications", In Proceedings of the 18th IEEE-NPSS Real Time Conference, Jun. 9, 2012, 8 Pages.
Lin, et al., "Empowering automotive vision with TI's Vision AccelerationPac", In white paper on the Texas Instruments Oct. 31, 2013, 8 Pages.
Office Action dated Apr. 19, 2016, U.S. Appl. No. 14/574,100.
"Second Written Opinion Issued in PCT Application No. PCT/US2015/063563", Mailed Date: May 31, 2016, 9 Pages.
"Second Written Opinion Issued in PCT Application No. PCT/US2015/063564", Mailed Date: May 31, 2016, 9 Pages.
Response to Office Action dated Jul. 29, 2016, U.S. Appl. No. 14/574,100.
"International Preliminary Report on Patentability Issued in PCT Application No. PCT/US2015/063563", Mailed Date: Aug. 29, 2016, 11 Pages.
Office Action dated Oct. 26, 2016, U.S. Appl. No. 14/574,100.
Response to Office Action dated Jan. 23, 2017, U.S. Appl. No. 14/574,100.
Office Action dated Feb. 27, 2017, U.S. Appl. No. 14/574,100.
Shearer, et al., "Interrupt Controller," U.S. Appl. No. 14/704,092, filed May 5, 2015.
Sanghvi, Hetul, "Low Power Architecture for Motion Compensation in a 4K Ultra-HD AVC and HEVC Video Codec System" In Proceedings of IEEE Second International Conference on Image Information Processing, Dec. 9, 2013, 5 pages.
Haraden, "Low Power DMA Snoop and Skip," U.S. Appl. No. 14/574,100, filed Dec. 17, 2014.
Response Office Action dated May 23, 2017, U.S. Appl. No. 14/574,100.

* cited by examiner

| Label | Description |
|---|---|
| 1xxx | Valid member of group "xxx" |
| 0111 | Current pixel is valid and not a member of any group |
| 0110-0001 | Additional tags |
| 0000 | Invalid pixel |

Configurable DMA settings: ⟋ 502
Minimum pixel value = 20;
Maximum pixel value = 98;
Delta = 5

Input stream of pixel data: ⟋ 504
- 12 (invalid) – below minimum pixel value
- 30 (assign group 0) – range for group 0 is set to 25-35
- 35 (assign group 0)
- 60 (assign group 1) – range for group 1 is set to 55-65
- 64 (assign group 1)
- 90 (assign group 2) – range for group 2 is set to 85-95
- 100 (invalid) – above maximum pixel value
- 200 (invalid) – above maximum pixel value
- 34 (assign to group 0)
- 36 (assign to group 3) – range for group 3 is set to 31-41
- 68 (assign to group 4) – range for group 4 is set to 63-73
- 42 (assign to group 5) – range for group 5 is set to 37-47

Metadata: ⟋ 506
- 1000_0000_0001_1110 (group 0, valid, no overflow, 0x30 midpoint of range)
- 1000_0000_0011_1100 (group 1, valid, no overflow, 0x60 midpoint of range)
- 1000_0000_0101_1010 (group 2, valid, no overflow, 0x90 midpoint of range)
- 1000_0000_0010_0100 (group 3, valid, no overflow, 0x36 midpoint of range)
- 1000_0000_0100_0100 (group 4, valid, no overflow, 0x68 midpoint of range)
- 1000_0000_0010_1010 (group 5, valid, no overflow, 0x42 midpoint of range)
- 0000_0000_0000_0000 (group 6, not valid)
- 0000_0000_0000_0000 (group 7, not valid)

No overflow

FIG. 5B

| Label | Description |
|---|---|
| xxxx | Each bit represents whether one of 4 regions is valid |
| 0000 | Skip all four regions |
| 1111 | All four regions are valid |
| 0100 | Only the 2nd region is valid |

FIG. 6A

| Row | Region 1 | Region 2 | Region 3 | Region 4 | Code |
|---|---|---|---|---|---|
| 1 | . . . 12, 12, . . . | . . . 12, 14, . . . | . . . 16, 12, . . . | . . . 17, 11, . . . | 0000 |
| 2 | . . . 11, 11, . . . | . . . 10, 13, . . . | . . . 15, 20, . . . | . . . 14, 14, . . . | 0010 |
| 3 | . . . 12, 12, . . . | . . . 12, 20, . . . | . . . 43, 45, . . . | . . . 15, 14, . . . | 0110 |
| 4 | . . . 12, 12, . . . | . . . 20, 20, . . . | . . . 40, 43, . . . | . . . 46, 15, . . . | 0111 |
| 5 | . . . 12, 20, . . . | . . . 45, 45, . . . | . . . 40, 44, . . . | . . . 44, 40, . . . | 0111 |
| 6 | . . . 12, 12, . . . | . . . 45, 45, . . . | . . . 12, 12, . . . | . . . 44, 40, . . . | 0101 |
| 7 | . . . 12, 45, . . . | . . . 45, 40, . . . | . . . 111, 99, . . . | . . . 45, 45, . . . | 1101 |
| 8 | . . . 12, 15, . . . | . . . 40, 40, . . . | . . . 120, 99, . . . | . . . 40, 45, . . . | 0101 |

FIG. 6B

| Row | Region 1 | Region 2 | Code |
|---|---|---|---|
| 1 | ... 12, 12, ...   ... 12, 14, ... | ... 16, 12, ...   ... 17, 11, ... | |
| 2 | ... 11, 11, ...   ... 10, 13, ... | ... 15, 20, ...   ... 14, 14, ... | |
| 3 | ... 12, 12, ...   ... 12, 16, ... | ... 43, 45, ...   ... 15, 14, ... | |
| 4 | ... 12, 12, ...   ... 15, 18, ... | ... 40, 43, ...   ... 46, 15, ... | |
| | Region 3 | Region 4 | |
| 5 | ... 12, 20, ...   ... 45, 45, ... | ... 40, 44, ...   ... 44, 40, ... | |
| 6 | ... 12, 12, ...   ... 45, 45, ... | ... 12, 12, ...   ... 44, 40, ... | |
| 7 | ... 12, 45, ...   ... 45, 40, ... | ... 111, 77, ...   ... 45, 45, ... | |
| 8 | ... 12, 15, ...   ... 40, 40, ... | ... 120, 99, ...   ... 40, 45, ... | 0111 |

LOW POWER DMA LABELING

BACKGROUND

Some computing systems provide a natural user interface in which the system may be controlled using gestures or spoken commands. For example, these systems may include a color camera (e.g., an RGB camera) and/or a depth camera for capturing images of an environment to detect motion and identify gestures. The depth camera may comprise an active illumination depth camera that utilizes time-of-flight (TOF) or structured light techniques for obtaining depth information. The color camera may capture a portion of the environment as a color image and the depth camera may capture a portion of the environment as a depth map. A depth map may comprise a two-dimensional image of the environment that includes depth information relating to the distances to objects within the environment from a particular reference point, such as a point associated with the depth camera. Each pixel in the two-dimensional image may be associated with a depth value representing a linear distance from the particular reference point.

A variety of techniques may be used to generate a depth map such as structured light illumination and time of flight techniques. Structured light illumination involves projecting a light pattern into an environment, capturing an image of the reflected light pattern, and then determining distance information from the spacings and/or distortions associated with the reflected light pattern relative to the projected light pattern. The light pattern may be projected using light that is invisible to the naked eye (e.g., IR or UV light) and may comprise a single dot, a single line, or a variety of dimensional patterns (e.g., horizontal and vertical lines, or checkerboard patterns). Time of flight techniques may determine distances to objects within an environment by timing how long it takes for light transmitted from a light source to travel to the objects and reflect back to an image sensor. In some cases, a short light pulse (or series of light pulses) may be projected into the environment at a first point in time and reflections associated with the short light pulse may be captured at a second point in time subsequent to the first point in time. A time of flight system may adjust the time difference between the first point in time and the second point in time in order to detect objects at a particular distance (or over a range of distances) associated with the time difference.

SUMMARY

Technology is described for processing pixel data using a Direct Memory Access (DMA) engine during a data transfer of the pixel data from a first memory (e.g., a DRAM) to a second memory (e.g., a local cache or an SRAM). The pixel data may derive from an image capturing device (e.g., a color camera or a depth camera) in which individual pixel values are not a multiple of eight bits. In some embodiments, the DMA engine may perform a variety of image processing operations on the pixel data prior to the pixel data being written into the second memory. In one example, the DMA engine may be configured to identify and label one or more pixels as being within a particular range of pixel values and/or the DMA engine may be configured to label pixels as belonging to one or more pixel groups based on their pixel values.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

FIG. 5B depicts one embodiment of metadata that is generated based on pixel data being transferred via a DMA engine.

FIG. 6A depicts one embodiment of a table showing mappings for a 4-bit metadata label that may be embedded within pixel data.

FIG. 6B depicts one embodiment of a portion of an image including one or more metadata codes embedded within the portion of the image.

FIG. 6C depicts one embodiment of a portion of an image including a metadata code embedded within the portion of the image.

DETAILED DESCRIPTION

Figure 1:
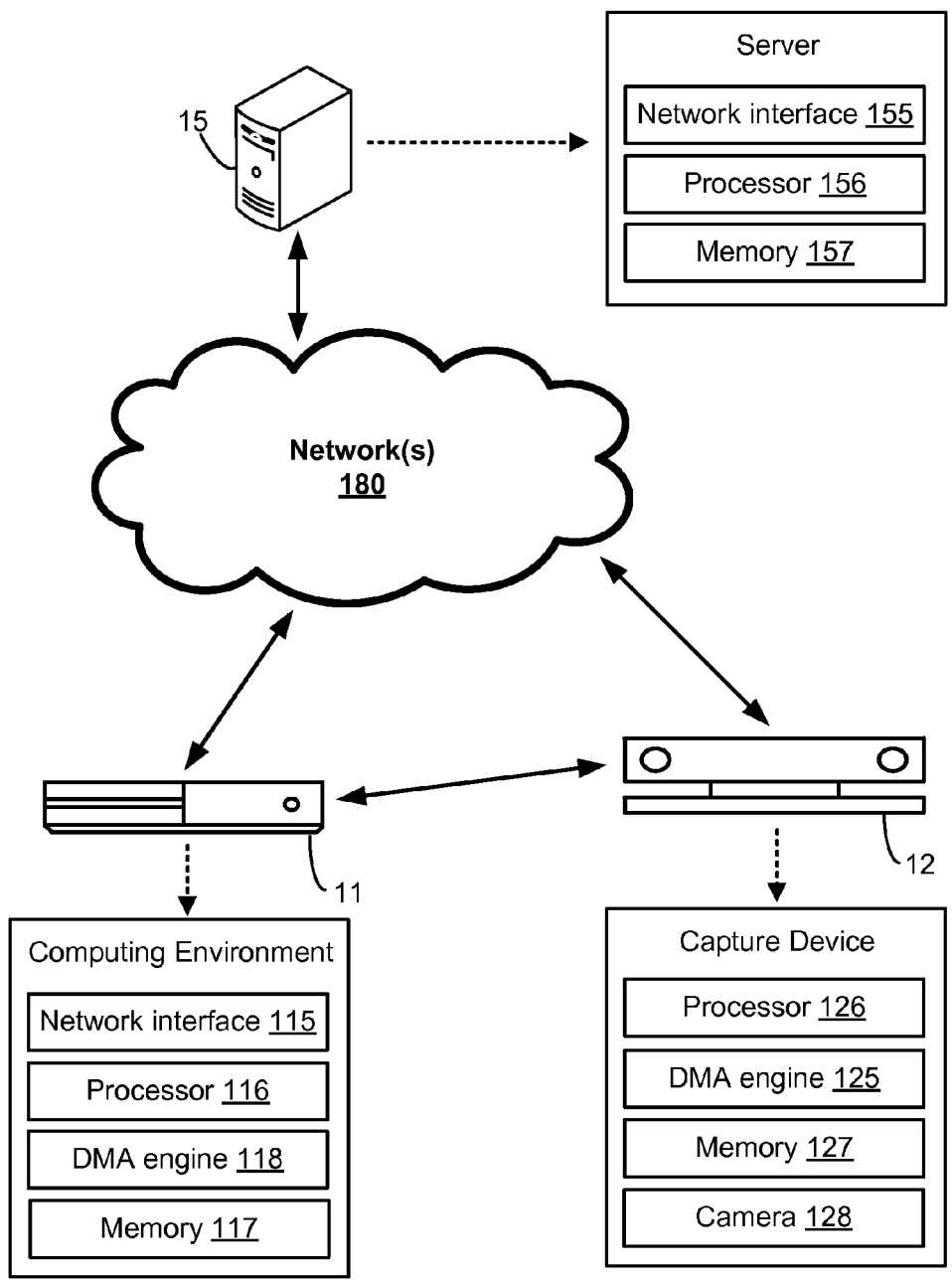
FIG. 1 is a block diagram of one embodiment of a networked computing environment.

Technology is described for preprocessing pixel data using a Direct Memory Access (DMA) engine during a data transfer of the pixel data from a first memory (e.g., a DRAM) to a second memory (e.g., a local cache used by a CPU or an SRAM). The pixel data may derive from an image capturing device (e.g., a color camera or a depth camera) in which individual pixel values do not correspond with a byte boundary (i.e., the pixel values are not a multiple of eight bits). In some cases, the pixel data may comprise 10-bit data values or 12-bit data values that may be stored using two bytes of data (e.g., to aid in downstream processing). The pixel values may correspond with color information and/or depth information. In one example, the pixel values may comprise 10-bit color values (e.g., 10-bit red color values, 10-bit green color values, and 10-bit blue color values). In another example, the pixel values may comprise 12-bit depth values. In some embodiments, a DMA engine may be configured to generate metadata associated with pixel data as the pixel data is transferred to a local memory and then store the metadata within the local memory. In one example, the metadata may be stored in a portion of the local memory associated with an interrupt vector or within unused bits of the two bytes for storing each of the pixel values. In the case that the pixel values are 10-bit data values, then the metadata may be written into the six unused bits of the two bytes of data.

The benefits of performing preprocessing operations on pixel data using a DMA engine, and in some cases, embedding metadata generated during the preprocessing operations within the pixel data, may include a reduction in the energy and/or power for performing various types of images processing operations involving the pixel data at a system level. The preprocessing operations may also improve performance (e.g., by allowing a processor to skip over data that has been labeled or tagged as not including pixel values within a particular range of interest).

In some embodiments, the DMA engine may perform a variety of image processing operations on the pixel data prior to the pixel data being written into a local memory directly accessible by a processor. In one example, the DMA engine may be configured to determine whether one or more pixels corresponding with the pixel data may be invalidated or skipped by the processor based on minimum and maximum pixel value thresholds provided to the DMA engine by the processor. In another example, the DMA engine may be configured to identify and label one or more pixels as being within a particular range of pixel values (e.g., is to identify and label pixels with pixel values between 50 and 80). In another example, the DMA engine may be configured to label pixels as belonging to one or more pixel groups based on their pixel values. In some cases, as the pixel data is being transferred to the local memory, the DMA engine may determine the one or more pixel groups (e.g., up to eight different pixel groups) and then assign or label each pixel as belonging to one of the one or more pixel groups as the pixel data is transferred to the local memory via the DMA engine.

The DMA engine may generate metadata associated with the image processing operations performed during the data transfer, such as which pixels are valid or invalid based on pixel value thresholds, which groups of pixels were generated, and to which group a particular pixel has been assigned. The metadata may be stored in a memory location associated with an interrupt that the processor may send to the processor or stored using the unused bits within the pixel data caused by pixel values being written into two bytes worth of data in order to fit within byte boundaries. For example, if 12-bit pixel values are written into two bytes worth of data, then each pixel value has an extra four bits of information that may be used for storing the metadata generated by the DMA engine.

Prior to performing image processing computations using a portion of an image that was been transferred into a local memory, the processor may first read metadata associated with the portion of the image in order to determine whether any pixels values within the portion of the image require additional data processing. In one example, the processor may read the metadata associated with the portion of the image and determine that none of the pixels within the portion of the image are valid or include pixel values within a particular range of pixel values. In another example, the processor may read the metadata associated with the portion of the image, determine that only a subset of the pixels within the portion of the image comprise pixel values that are within a particular depth range (e.g., between 1 meter and 1.5 meters), and skip the portions of the image that are not part of the subset.

In some embodiments, a processor may configure a DMA engine to perform a particular preprocessing operation depending on an image processing operation (e.g., an edge detection operation or a connected components operation) being performed by the processor. To support the image processing operation, the DMA engine may be configured to determine pixel groupings based on a minimum threshold (e.g., the minimum pixel value in any pixel group must be greater than or equal to 50), a maximum threshold (e.g. the maximum pixel value in any of the pixel groups must be less than or equal to 240), the size or range of each pixel group (e.g., a delta may be used to specify the allowed pixel values relative to a midpoint pixel value), and the maximum number of pixel groups that may be generated (e.g., at most eight pixel groups may be generated). The maximum and minimum pixel value thresholds and the range of each pixel group may be set and vary depending on the type of pixels being operated on by the DMA engine (e.g., whether the pixels represent color values or depth values). The pixel value ranges for each of the pixel groups may be the same size or different sizes (e.g., a first set of pixel groups may correspond with a first delta and a second set of pixel groups may correspond with a second delta that is greater than the first delta). In cases where more than the maximum number of pixel groups is required, an overflow flag within the metadata may be set indicating that an overflow has occurred and that the maximum number of pixel groups was not large enough to characterize all of the pixel values transferred during the data transfer.

In some cases, the configuration settings for the DMA engine (e.g., the minimum and maximum pixel value thresholds and the ranges for each of the pixel groups) may vary over each DMA data transfer, vary per image transferred using the DMA engine, or vary per a portion of the image transferred. In one example, while the DMA engine is transferring a first set of pixel data to a local memory during a first time period, a first set of DMA configuration settings may be applied to generate a first set of pixel groupings. While the DMA engine is transferring a second set of pixel data to the local memory during a second time period subsequent to the first time period, a second set of DMA configuration setting different from the first set of DMA configuration settings may be applied to generate a second set of pixel groupings. The first set of pixel data may correspond with a first image captured from an image capturing device and the second set of pixel data may correspond with a second image captured from the image capturing device. In one embodiment, a processor performing an edge detection operation on an image may partition the image into a plurality of image blocks. If the processor has identified edge pixels as being associated with pixel values between a first pixel value and a second pixel value, then the processor may configure the DMA engine to label pixels as belonging to a particular pixel group if their pixel values are between the first value (e.g., a minimum value for the particular pixel group) and the second value (e.g., a maximum value for the particular pixel group).

In one embodiment, the DMA engine may include a memory buffer that may store 128 bytes of data (or another size of data, for example, a size that is sufficient to store a DRAM burst size). While an image (e.g., 64 KB of data) is being transferred via the DMA engine, the pixel values located within the memory buffer may be operated on in order to generate metadata associated with the image. In some cases, midpoint pixel values that would prevent overlaps between pixel value ranges of two or more pixel groupings may be identified. In the case that each pixel comprises two bytes per pixel, the DMA engine may perform operations on 64 pixels (i.e., 128 B/2 B) at the same time or in parallel. In another embodiment, the DMA engine may perform operations (e.g., generating and assigning pixel groupings) using a number of pixels based on a width of a data bus (e.g., 64 bits or 128 bits) used by the DMA engine for transferring the image. In the case that each pixel comprises two bytes per pixel, the DMA engine may perform operations on four pixels (for a 64-bit data bus) or eight pixels (for a 128-bit data bus) at the same time or in parallel.

FIG. 1 is a block diagram of one embodiment of a networked computing environment 100 in which the disclosed technology may be practiced. Networked computing environment 100 includes a plurality of computing devices interconnected through one or more networks 180. The one or more networks 180 allow a particular computing device to connect to and communicate with another computing device. The depicted computing devices include computing environment 11, capture device 12, and server 15. The computing environment 11 may comprise a server, a gaming console, or a personal computer. In some embodiments, the plurality of computing devices may include other computing devices not shown. In some embodiments, the plurality of computing devices may include more than or less than the number of computing devices shown in FIG. 1. The one or more networks 180 may include a secure network such as an enterprise private network, an unsecure network such as a wireless open network, a local area network (LAN), a wide area network (WAN), and the Internet. Each network of the one or more networks 180 may include hubs, bridges, routers, switches, and wired transmission media such as a wired network or direct-wired connection.

One embodiment of computing environment 11 includes a network interface 115, processor 116, DMA engine 118, and memory 117, all in communication with each other. Network interface 115 allows computing environment 11 to connect to one or more networks 180. Network interface 115 may include a wireless network interface, a modem, and/or a wired network interface. Processor 116 allows computing environment 11 to execute computer readable instructions stored in memory 117 in order to perform processes discussed herein.

The DMA engine 118 may facilitate access to memory 117 independently of processor 116. In some cases, processor 116 may initiate a data transfer to the memory 117 and configure DMA engine 118 to control the data transfer. The DMA engine 118 may then generate memory address and initiate read and/or write cycles to the memory 117 and provide an interrupt to the processor 116 after the data transfer has been completed. The DMA engine 118 may include control logic, memory address registers, byte count registers, a memory buffer, and one or more control registers. The one or more control registers may be used to determine the direction of the data transfer and the number of bytes to be transferred during the data transfer. In some cases, the DMA engine 118 may perform image processing operations or image preprocessing operations.

In some embodiments, the computing environment 11 may include one or more CPUs and/or one or more GPUs. In some cases, the computing environment 11 may integrate CPU and GPU functionality on a single chip. In some cases, the single chip may integrate general processor execution with computer graphics processing (e.g., 3D geometry processing) and other GPU functions including GPGPU computations. The computing environment 11 may also include one or more FPGAs for accelerating graphics processing or performing other specialized processing tasks. In one embodiment, the computing environment 11 may include a CPU and a GPU in communication with a shared RAM. The shared RAM may comprise a DRAM (e.g., a DDR3 SDRAM).

Server 15 may allow a client or computing device to download information (e.g., text, audio, image, and video files) from the server or to perform a search query related to particular information stored on the server. In one example, a computing device may download content from server 15 or upload content to server 15. In general, a "server" may refer to a hardware device that acts as the host in a client-server relationship or a software process that shares a resource with or performs work for one or more clients. Communication between computing devices in a client-server relationship may be initiated by a client sending a request to the server asking for access to a particular resource or for particular work to be performed. The server may subsequently perform the actions requested and send a response back to the client.

One embodiment of server 15 includes a network interface 155, processor 156, and memory 157, all in communication with each other. Network interface 155 allows server 15 to connect to one or more networks 180. Network interface 155 may include a wireless network interface, a modem, and/or a wired network interface. Processor 156 allows server 15 to execute computer readable instructions stored in memory 157 in order to perform processes discussed herein.

One embodiment of capture device 12 includes a processor 126, memory 127, camera 128, sensors 129, and DMA engine 125, all in communication with each other. Processor 126 allows capture device 12 to execute computer readable instructions stored in memory 127 in order to perform processes discussed herein. In some cases, the processor 126 may perform image processing operations on data captured by camera 128. Camera 128 may capture color images and/or depth images of an environment. The capture device 12 may capture color images and/or depth images of the environment.

The DMA engine 125 may facilitate access to memory 127 independently of processor 126. In some cases, processor 126 may initiate a data transfer to the memory 127 and configure DMA engine 125 to control the data transfer. The DMA engine 125 may then generate memory address and initiate read and/or write cycles to the memory 127 and provide an interrupt to the processor 126 after the data transfer has been completed. The DMA engine 125 may include control logic, memory address registers, byte count registers, a memory buffer, and one or more control registers. The one or more control registers may be used to determine the direction of the data transfer and the number of bytes to be transferred during the data transfer. In some cases, the DMA engine 125 may perform image processing operations or image preprocessing operations.

In some embodiments, various components of a computing device, such as computing environment 11 or capture device 12, may include a network interface, processor, and memory that may be integrated on a single chip substrate. In one example, the components may be integrated as a system on a chip (SOC). In other embodiments, the components may be integrated within a single package.

In some embodiments, a computing device may provide a natural user interface (NUI) to an end user of the computing device by employing cameras, sensors, and gesture recognition software. With a natural user interface, a person's body parts and movements may be detected, interpreted, and used to control various aspects of a computing application running on the computing device. In one example, a computing device utilizing a natural user interface may detect actions performed by an end user interacting with the computing device (e.g., that the end user has performed a particular gesture in order to control the computing device).

Networked computing environment 100 may provide a cloud computing environment for one or more computing devices. Cloud computing refers to Internet-based computing, wherein shared resources, software, and/or information are provided to one or more computing devices on-demand via the Internet (or other global network). The term "cloud" may be used as a metaphor for the Internet, based on the cloud drawings used in computer networking diagrams to depict the Internet as an abstraction of the underlying infrastructure it represents.

In one embodiment, a DMA engine, such as DMA engine 118 or DMA engine 125, may perform a variety of image processing operations on pixel data (or other image related data) being transferred by the DMA engine. In one example, the DMA engine may be configured to determine whether one or more pixels corresponding with the pixel data may be invalidated or skipped by the processor based on minimum and maximum pixel value thresholds provided to the DMA engine. In another example, the DMA engine may be configured to identify and label one or more pixels as being within a particular range of pixel values (e.g., to identify and label pixels with pixel values between 190 and 230). In another example, the DMA engine may be configured to label pixels as belonging to one or more pixel groups based on their pixel values.

The pixel labels and other metadata generated by the DMA engine may be generated on a per pixel basis or on a per pixel region basis (e.g., over a plurality of pixels within an image). In one example, the metadata may correspond with a row of pixels (e.g., each row of pixels may comprise 1024 pixels). In another example, the metadata may correspond with a two-dimensional portion of an image (e.g., a 4×4 grouping of pixels within the image, a 320×640 grouping of pixels within the image, or $¼^{th}$ of the entire image).

Figure 2:
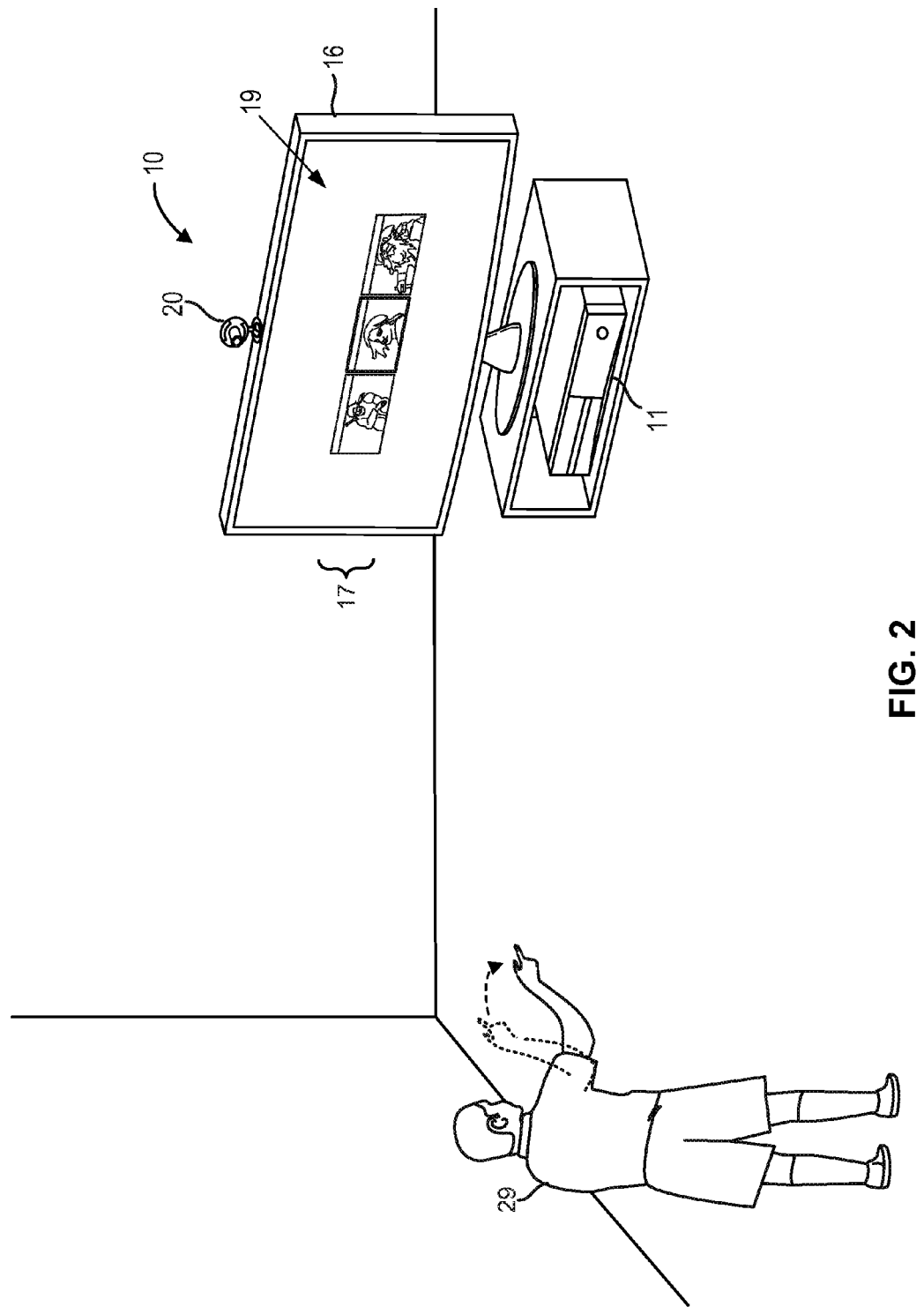
FIG. 2 depicts one embodiment of a computing system that utilizes depth sensing for performing object and/or gesture recognition.

FIG. 2 depicts one embodiment of a computing system 10 that utilizes depth sensing for performing object and/or gesture recognition. The computing system 10 may include a computing environment 11, a capture device 20, and a display 16, all in communication with each other. Computing environment 11 may include one or more processors. Capture device 20 may include one or more color or depth sensing cameras that may be used to visually monitor one or more targets including humans and one or more other real objects within a particular environment. Capture device 20 may also include a microphone. In one example, capture device 20 may include a depth sensing camera and a microphone and computing environment 11 may comprise a gaming console.

In some embodiments, the capture device 20 may include an active illumination depth camera, which may use a variety of techniques in order to generate a depth map of an environment or to otherwise obtain depth information associated the environment including the distances to objects within the environment from a particular reference point. The techniques for generating depth information may include structured light illumination techniques and time of flight (TOF) techniques.

As depicted in FIG. 2, a user interface 19 is displayed on display 16 such that an end user 29 of the computing system 10 may control a computing application running on computing environment 11. The user interface 19 includes images 17 representing user selectable icons. In one embodiment, computing system 10 utilizes one or more depth maps in order to detect a particular gesture being performed by end user 29. In response to detecting the particular gesture, the computing system 10 may control the computing application, provide input to the computing application, or execute a new computing application. In one example, the particular gesture may be used to identify a selection of one of the user selectable icons associated with one of three different story seeds for a video game. In one embodiment, an end user of the computing system 10 may generate a video game by controlling a video game development environment viewed on the display 16 using gestures.

Figure 3:
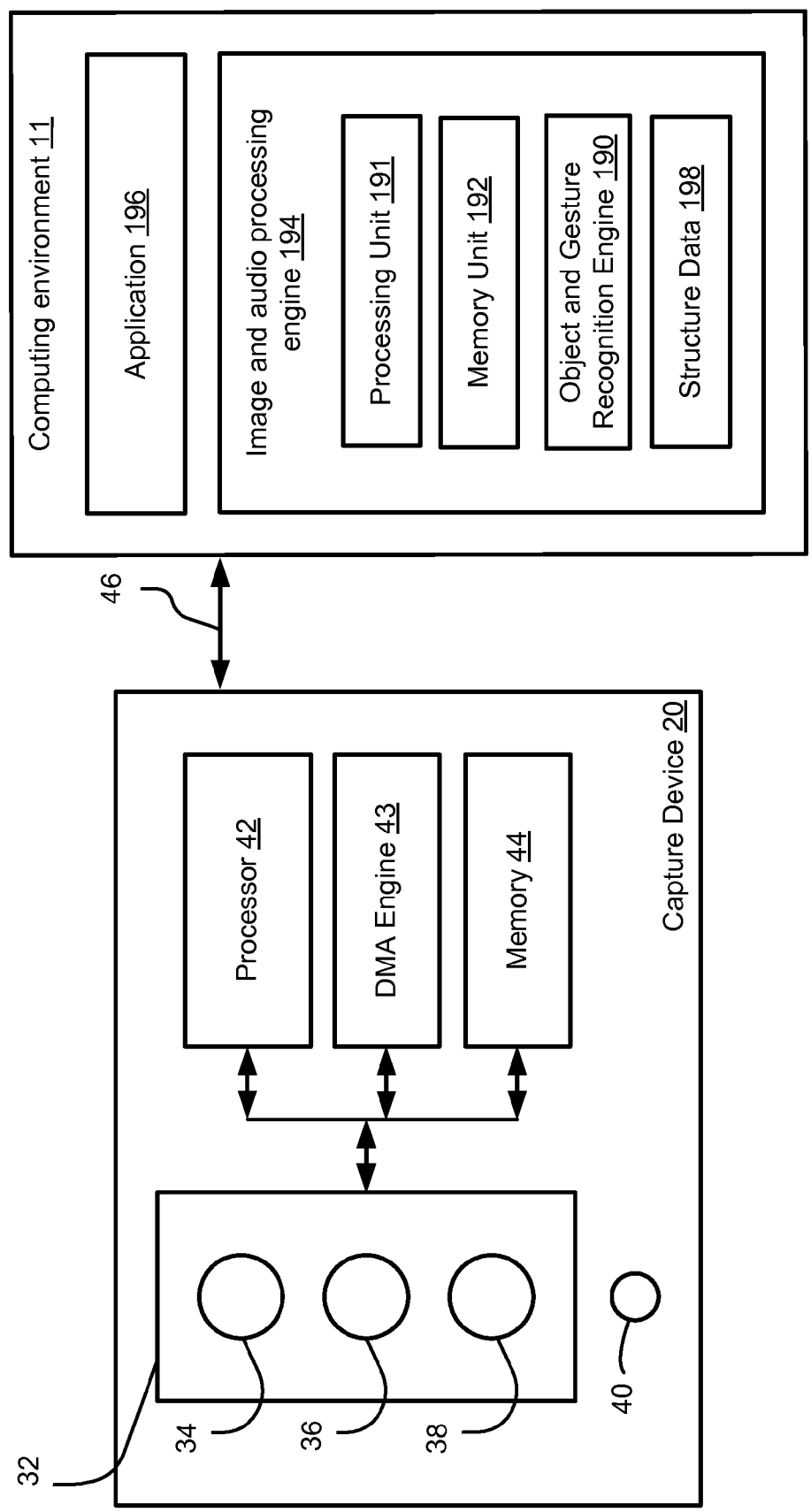
FIG. 3 depicts one embodiment of computing system including a capture device and a computing environment.

FIG. 3 depicts one embodiment of computing system 10 including a capture device 20 and computing environment 11. In some embodiments, capture device 20 and computing environment 11 may be integrated within a single computing device. The single computing device may comprise a mobile device.

In one embodiment, the capture device 20 may include one or more image sensors for capturing images and videos. An image sensor may comprise a CCD image sensor or a CMOS image sensor. In some embodiments, capture device 20 may include an IR CMOS image sensor. The capture device 20 may also include a depth sensor (or depth sensing camera) configured to capture video with depth information including a depth image that may include depth values via any suitable technique including, for example, time-of-flight, structured light, stereo image, or the like.

The capture device 20 may include an image camera component 32. In one embodiment, the image camera component 32 may include a depth camera that may capture a depth image of a scene. The depth image may include a two-dimensional (2-D) pixel area of the captured scene where each pixel in the 2-D pixel area may represent a depth value such as a distance in, for example, centimeters, millimeters, or the like of an object in the captured scene from the image camera component 32.

The image camera component 32 may include an IR light component 34, a three-dimensional (3-D) camera 36, and an RGB camera 38 that may be used to capture the depth image of a capture area. For example, in time-of-flight analysis, the IR light component 34 of the capture device 20 may emit an infrared light onto the capture area and may then use sensors to detect the backscattered light from the surface of one or more objects in the capture area using, for example, the 3-D camera 36 and/or the RGB camera 38. In some embodiments, pulsed infrared light may be used such that the time between an outgoing light pulse and a corresponding incoming light pulse may be measured and used to determine a physical distance from the capture device 20 to a particular location on the one or more objects in the capture area. Additionally, the phase of the outgoing light wave may be compared to the phase of the incoming light wave to determine a phase shift. The phase shift may then be used to determine a physical distance from the capture device to a particular location associated with the one or more objects.

In another example, the capture device 20 may use structured light to capture depth information. In such an analysis, patterned light (i.e., light displayed as a known pattern such as grid pattern or a stripe pattern) may be projected onto the capture area via, for example, the IR light component 34. Upon striking the surface of one or more objects (or targets) in the capture area, the pattern may become deformed in response. Such a deformation of the pattern may be captured by, for example, the 3-D camera 36 and/or the RGB camera 38 and analyzed to determine a physical distance from the capture device to a particular location on the one or more objects. Capture device 20 may include optics for producing collimated light. In some embodiments, a laser projector may be used to create a structured light pattern. The light projector may include a laser, laser diode, and/or LED.

In some embodiments, two or more different cameras may be incorporated into an integrated capture device. For example, a depth camera and a video camera (e.g., an RGB video camera) may be incorporated into a common capture device. In some embodiments, two or more separate capture devices of the same or differing types may be cooperatively used. For example, a depth camera and a separate video camera may be used, two video cameras may be used, two depth cameras may be used, two RGB cameras may be used, or any combination and number of cameras may be used. In one embodiment, the capture device 20 may include two or more physically separated cameras that may view a capture area from different angles to obtain visual stereo data that may be resolved to generate depth information. Depth may also be determined by capturing images using a plurality of detectors that may be monochromatic, infrared, RGB, or any other type of detector and performing a parallax calculation. Other types of depth image sensors can also be used to create a depth image.

As depicted, capture device 20 may also include one or more microphones 40. Each of the one or more microphones 40 may include a transducer or sensor that may receive and convert sound into an electrical signal. The one or more microphones may comprise a microphone array in which the one or more microphones may be arranged in a predetermined layout.

The capture device 20 may include a processor 42 that may be in communication with the image camera component 32. The processor 42 may include a standardized processor, a specialized processor, a microprocessor, or the like. The processor 42 may execute instructions that may include instructions for receiving and analyzing images. It is to be understood that at least some image analysis and/or target analysis and tracking operations may be executed by processors contained within one or more capture devices such as capture device 20.

The capture device 20 may include a memory 44 that may store the instructions that may be executed by the processor 42, images or frames of images captured by the 3-D camera or RGB camera, filters or profiles, or any other suitable information, images, or the like. DMA engine 43 may facilitate data transfers to and from the memory 44. In one example, the memory 44 may include random access memory (RAM), read only memory (ROM), cache, Flash memory, a hard disk, or any other suitable storage component. As depicted, the memory 44 may be a separate component in communication with the image capture component 32 and the processor 42. In another embodiment, the memory 44 may be integrated into the processor 42 and/or the image capture component 32. In other embodiments, some or all of the components 32, 34, 36, 38, 40, 42, 43 and 44 of the capture device 20 may be housed in a single housing.

The capture device 20 may be in communication with the computing environment 11 via a communication link 46. The communication link 46 may be a wired connection including, for example, a USB connection, a FireWire connection, an Ethernet cable connection, or the like and/or a wireless connection such as a wireless 802.11b, g, a, or n connection. The computing environment 12 may provide a clock to the capture device 20 that may be used to determine when to capture, for example, a scene via the communication link 46. In one embodiment, the capture device 20 may provide the images captured by, for example, the 3D camera 36 and/or the RGB camera 38 to the computing environment 11 via the communication link 46.

As depicted in FIG. 3, computing environment 11 may include an image and audio processing engine 194 in communication with application 196. Application 196 may comprise an operating system application or other computing application such as a video game development program. Image and audio processing engine 194 includes object and gesture recognition engine 190, structure data 198, processing unit 191, and memory unit 192, all in communication with each other. Image and audio processing engine 194 processes video, image, and audio data received from capture device 20. To assist in the detection and/or tracking of objects, image and audio processing engine 194 may utilize structure data 198 and object and gesture recognition engine 190.

Processing unit 191 may include one or more processors for executing object, facial, and/or voice recognition algorithms. In one embodiment, image and audio processing engine 194 may apply object recognition and facial recognition techniques to image or video data. For example, object recognition may be used to detect particular objects (e.g., soccer balls, cars, or landmarks) and facial recognition may be used to detect the face of a particular person. Image and audio processing engine 194 may apply audio and voice recognition techniques to audio data. For example, audio recognition may be used to detect a particular sound. The particular faces, voices, sounds, and objects to be detected may be stored in one or more memories contained in memory unit 192. Processing unit 191 may execute computer readable instructions stored in memory unit 192 in order to perform processes discussed herein.

The image and audio processing engine 194 may utilize structure data 198 while performing object recognition. Structure data 198 may include structural information about targets and/or objects to be tracked. For example, a skeletal model of a human may be stored to help recognize body parts. In another example, structure data 198 may include structural information regarding one or more inanimate objects in order to help recognize the one or more inanimate objects.

The image and audio processing engine 194 may also utilize object and gesture recognition engine 190 while performing gesture recognition. In one example, object and gesture recognition engine 190 may include a collection of gesture filters, each comprising information concerning a gesture that may be performed by a skeletal model. The object and gesture recognition engine 190 may compare the data captured by capture device 20 in the form of the skeletal model and movements associated with it to the gesture filters in a gesture library to identify when a user (as represented by the skeletal model) has performed one or more gestures. In one example, image and audio processing engine 194 may use the object and gesture recognition engine 190 to help interpret movements of a skeletal model and to detect the performance of a particular gesture.

Figures 4, 5A:
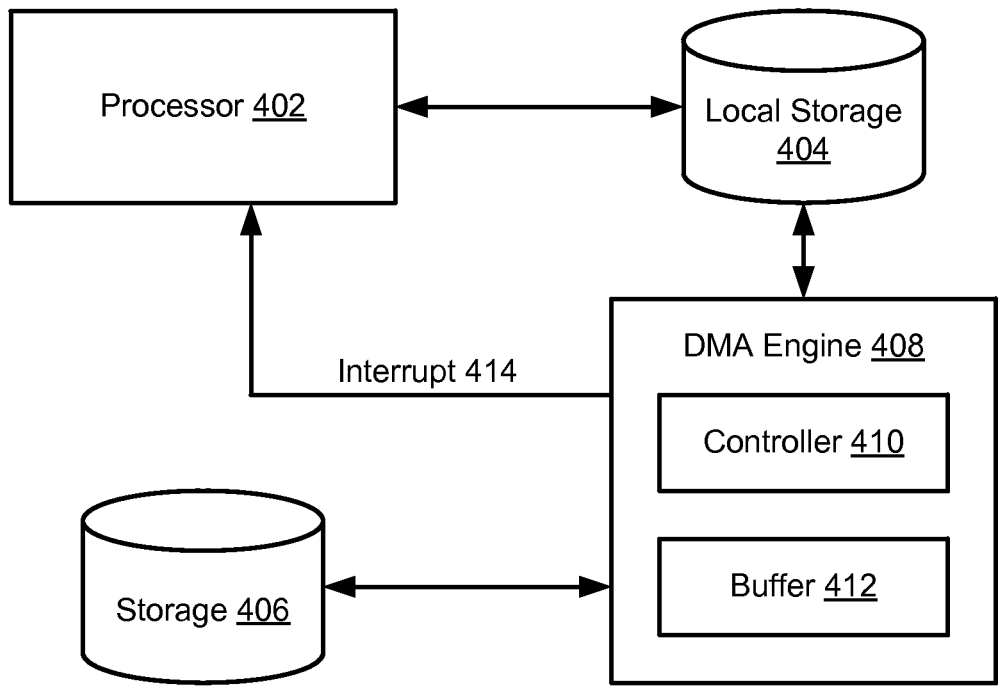
FIG. 4 depicts one embodiment of a portion of a computing system.
FIG. 5A depicts one embodiment of a table showing mappings for a 4-bit metadata label that may be embedded within pixel data.

FIG. 4 depicts one embodiment of a portion of a computing system, such as computing system 10 in FIG. 2. In some cases, the portion of the computing system may be located within a capture device, such as capture device 20 in FIG. 3, or within a computing environment, such as computing environment 11 in FIG. 3. As depicted, the portion of the computing system includes a processor 402 (e.g., a CPU), a local storage 404 (e.g., a local cache for the processor), a storage 406 (e.g., a DRAM), and a DMA engine 408 in communication with the local storage 404 and the storage 406. The DMA engine 408 may send or transmit an interrupt signal 414 to the processor 402. For example, the DMA engine 408 may send an interrupt signal 414 to the processor 402 after completion of a data transfer from the storage 406 to the local storage 404 via the DMA engine 408. The DMA engine 408 includes a controller 410 and a buffer 412 (e.g., a 128 B or 1024 KB memory buffer).

In one embodiment, as pixel data is transferred from the storage 406 to the local storage 404 via the DMA engine 408, the DMA engine 408 may perform image preprocessing operations on the pixel data, and in some cases, modify the pixel data before writing the pixel data to the local storage 404. In some cases, the storage 406, DMA engine 408, and local storage 404 may be connected to a memory bus (e.g., a 64-bit or 128-bit memory bus). In cases where pixels within the pixel data are each represented using two bytes, the DMA engine 408 may perform the image preprocessing operations on the four pixels (for the 64-bit bus) or eight pixels (for the 128-bit bus) while the DMA engine 408 is streaming or transferring the pixel data to the local storage 404. The image preprocessing operations may generate metadata associated with the four or eight pixels. The metadata may then be embedded within unused bits of the four or eight pixels (e.g., if a pixel comprises a 12-bit pixel value stored within 16 bits of data, then there will be 4 unused bits). The DMA engine 408 may embed the metadata within the unused bits and then write the updated pixels to the local storage 404. After the updated pixel data has been transferred to the local storage 404, the DMA engine 408 may transmit an interrupt signal 414 to the processor 402 to communicate to the processor 402 that the pixel data has been transferred to the local storage 404.

FIG. 5A depicts one embodiment of a table showing mappings for a 4-bit metadata label that may be embedded within pixel data. In this case, if a particular pixel is represented using a 12-bit pixel value that is stored within 16 bits of data, then the 4-bit metadata label may be embedded within the four unused bits of the particular pixel. As depicted, if the metadata label comprises "1xxx," then the particular pixel has been assigned as a valid member of the pixel group "xxx." In one example, a metadata label comprising "1001" may be used to specify that the particular pixel is a valid member of the pixel group "001." If the metadata label comprises "0111," then the particular pixel is valid (e.g., the pixel value is within a valid range of pixel values) but is not a member of any pixel group. If the metadata label comprises "0000," then the particular pixel is an invalid pixel (e.g., the particular pixel includes a pixel value that is above a maximum pixel value threshold or below a minimum pixel value threshold).

FIG. 5B depicts one embodiment of metadata that is generated based on pixel data being transferred via a DMA engine, such as DMA engine 408 FIG. 4. The DMA engine 408 may be configured using configurable DMA settings 502. The configurable DMA settings 502 may include a minimum pixel value (e.g., a minimum pixel value of 20), a maximum pixel value (e.g., a maximum pixel value of 98), and a delta or pixel group range (e.g., each pixel group generated may be centered around a midpoint pixel value and include pixel values within a plus or minus delta of the midpoint pixel value). As depicted, an input stream of pixel data 504 may be buffered and transferred via the DMA engine. As the input stream of pixel data 504 is buffered within the DMA engine, the DMA engine may generate metadata (e.g., labels for each pixel assigning the pixel to one of a plurality of pixel groupings and information specifying the pixel groupings generated by the DMA engine) and embed the metadata within the pixel data prior to transferring the pixel data to a target memory.

As depicted, the first pixel received by the DMA engine has a pixel value of 12. As the pixel value is below the minimum pixel value of 20, the first pixel is labeled as being invalid and a metadata label associated with an invalid pixel (e.g., "0000") may be embedded within the first pixel. The second pixel received by the DMA engine has a pixel value of 30. If the second pixel value does not map to an existing pixel grouping, then the DMA engine may generate a new pixel grouping as long as a maximum number of pixel groupings has not been exceeded. In this case, the second pixel value of 30 is used as a midpoint for a new pixel grouping (i.e., pixel group 0) with a range between pixel values of 25 and 35. The third pixel received by the DMA engine has a pixel value of 35. As the third pixel value is within the range corresponding with pixel group 0, the DMA engine labels the third pixel as belonging to the pixel group 0 by embedding a metadata label associated with pixel group 0 (e.g., "1000") within the third pixel.

The fourth pixel received by the DMA engine has a pixel value of 60. In this case, the DMA engine generates a new pixel grouping (i.e., pixel group 1) with a range between pixel values of 55 and 65. The fifth pixel received by the DMA engine has a pixel value of 64. As the fifth pixel value is within the range corresponding with pixel group 1, the DMA engine labels the fifth pixel as belonging to the pixel group 1 by embedding a metadata label associated with pixel group 1 (e.g., "1001") within the fifth pixel. The sixth pixel received by the DMA engine has a pixel value of 90. In this case, the DMA engine generates a new pixel grouping (i.e., pixel group 2) with a range between pixel values of 85 and 95. The seventh pixel received by the DMA engine has a pixel value of 100. As the pixel value is above the maximum pixel value of 98, the seventh pixel is labeled as being invalid and a metadata label associated with an invalid pixel (e.g., "0000") may be embedded within the seventh pixel. The eighth pixel received by the DMA engine also has a pixel value greater than the maximum pixel value of 98 and may also be labeled as being an invalid pixel.

The ninth pixel received by the DMA engine has a pixel value of 34 and is assigned to pixel group 0. The tenth pixel received by the DMA engine has a pixel value of 36 and is assigned to a newly generated pixel group 3. In this case, the range of pixel group 3 is between 31 and 41 and overlaps with the range of pixel group 0, which is between 25 and 35. The eleventh pixel received by the DMA engine has a pixel value of 68 and is assigned to a newly generated pixel group 4. In this case, the range of pixel group 4 is between 63 and 73 and overlaps with the range of pixel group 1, which is between 55 and 65. The twelfth pixel received by the DMA engine has a pixel value of 42 and is assigned to a newly generated pixel group 5. In this case, the range of pixel group 5 is between 37 and 47 and overlaps with the range of pixel group 3, which is between 37 and 47.

In some embodiments, rather than generating new pixel groupings as each individual pixel value is received by the DMA engine, the pixel groupings may be generated by determining a minimum number of new pixel groupings required to group a plurality of pixel values within a memory buffer of the DMA engine. In one example, the DMA engine may store the pixel data 504 depicted in FIG. 5B in a memory buffer and determine a minimum number of new pixel groupings for the pixel data 504. In this case, the DMA engine may generate four pixel groupings. The four pixel groupings may include a first pixel grouping with a midpoint of 35, a second pixel grouping with a midpoint of 45, a third pixel grouping of the midpoint of 65, and a fourth pixel grouping with a midpoint of 90. The pixels corresponding with pixel values 30, 34, 35, and 36 may be labeled with the first pixel grouping. The pixel corresponding with a pixel value of 42 may be labeled with the second pixel grouping. The pixels corresponding with the pixel values of 60, 64, and 68 may be labeled with the third pixel grouping. The pixel corresponding with the pixel value of 90 may be labeled with the fourth pixel grouping. Thus, the number of new pixel groupings may be reduced based on the number of pixel values stored within the memory buffer.

After the DMA engine has generated a number of pixel groupings, metadata associated with the pixel groupings generated may be transmitted to a processor directly or stored within a local memory that corresponds with an interrupt request that is transmitted to the processor. If the number of pixel groupings exceeds a maximum number of pixel groupings, then an overflow may be detected and the metadata associated with the pixel groupings may specify that an overflow condition has occurred. As depicted in FIG. 5B, an overflow condition has not occurred as the number of pixel groupings generated (corresponding with pixel groups 0 through 5) is less than the maximum number of pixel groupings (e.g., less than a maximum of eight pixel groupings).

The metadata associated with the pixel groupings may comprise a plurality of vectors corresponding with a plurality of pixel groupings. Each vector may comprise 16 bits. The first bit (e.g., the most significant bit) may correspond with whether a pixel grouping is valid, the second bit may correspond with whether an overflow condition has occurred for the pixel groupings, and 12 bits may corresponds with a midpoint pixel value for the pixel grouping. As depicted in FIG. 5B, the metadata 506 includes a first vector (1000_0000_0000_1110) associated with the pixel grouping 0. The first vector specifies a midpoint for the pixel grouping 0 of 30. The metadata 506 includes a second vector (1000_0000_0011_1100) associated with the pixel grouping 1. The second vector specifies a midpoint for the pixel grouping 1 of 60. The metadata 506 includes a third vector (1000_0000_0101_1010) associated with the pixel grouping 2. The third vector specifies a midpoint for the pixel grouping 2 of 90. The metadata 506 includes a fourth vector (1000_0000_0010_0100) associated with the pixel grouping 3. The fourth vector specifies a midpoint for the pixel grouping 3 of 36. The metadata 506 includes a fifth vector (1000_0000_0100_0100) associated with the pixel grouping 4. The fifth vector specifies a midpoint for the pixel grouping 4 of 68. The metadata 506 includes a sixth vector (1000_0000_0010_1010) associated with the pixel grouping 5. The sixth vector specifies a midpoint for the pixel grouping 5 of 42. The metadata 506 includes two additional vectors that are marked as invalid vectors.

FIG. 6A depicts one embodiment of a table showing mappings for a 4-bit metadata label that may be embedded within pixel data. As depicted, the O-bit metadata label may specify whether one or more of four regions within the pixel data are valid (e.g., whether a particular region within the pixel data includes pixel values within a particular range of pixel values between a maximum pixel value threshold and a minimum pixel value threshold). In one example, a metadata label of "0000" may represent that none of the four regions include valid pixel values and that all four of the regions may be skipped when applying further image processing to the pixel data. In another example, a metadata label of "1111" may represent that all four regions include valid pixel values and that none of the four regions may be skipped when applying further image processing to the pixel data. In another example, a metadata label of "0100" may represent that only a second region of four regions within the pixel data includes valid pixel values.

FIG. 6B depicts one embodiment of a portion of an image including one or more metadata codes embedded within the portion of the image. As depicted, the portion of the image includes eight rows of pixel values. Each row may be partitioned into four regions. In one example, each row of pixel values may include 1024 pixel values and each region within the row may include 256 pixel values. For each pixel row, a metadata code associated with whether one or more of the regions within the pixel row includes valid pixel values may be embedded within a last pixel value within the pixel row or within one of the pixel values within the pixel row.

As depicted in FIG. 6B, as none of the pixel values within the first pixel row includes a pixel value that is greater than a minimum pixel value of 19, the metadata code embedded within a pixel of the first pixel row includes "0000" representing that none of the regions within the first pixel row includes valid pixel values. In the second pixel row, as only Region 3 out of the four regions includes a pixel value that is between the minimum pixel value of 19 and a maximum pixel value of 98, the metadata code embedded within the second pixel row includes "0010." In the third pixel row, as only Region 2 and Region 3 include valid pixel values, the metadata code embedded within the third pixel row includes "0110." In the fourth pixel row, as only Region 2, Region 3, and Region 4 include valid pixel values, the metadata code embedded within the fourth pixel row includes "0111." In the fifth pixel row, as only Region 2, Region 3, and Region 4 include valid pixel values, the metadata code embedded within the fifth pixel row includes "0111." In the sixth pixel row, as only Region 2 and Region 4 include valid pixel values, the metadata code embedded within the sixth pixel row includes "0101." In the seventh pixel row, as only Region 1, Region 2, and Region 4 include valid pixel values, the metadata code embedded within the seventh pixel row includes "1101." In the eighth pixel row, as only Region 2 and Region 4 include valid pixel values, the metadata code embedded within the eighth pixel row includes "0101." Thus, per pixel row, a processor may first read a byte within a pixel row that includes the embedded metadata code in order to determine whether one or more of the four regions within the pixel row includes valid pixel values. In the event that none of the four regions includes valid pixel values, then the processor may skip the entire row and move to the next pixel row. In the event that only one of the four regions includes valid pixel values, then the processor may only read the 256 pixel values from that region rather than reading the entire 1024 pixel values from the entire pixel row.

FIG. 6C depicts one embodiment of a portion of an image including a metadata code embedded within the portion of the image. As depicted, the portion of the image includes four regions of pixel values. A first region (Region 1) of the four regions corresponds with pixel values within a first half of pixel rows 1-4. A second region (Region 2) of the four regions corresponds with pixel values within a second half of pixel rows 1-4. A third region (Region 3) of the four regions corresponds with pixel values within the first half of pixel rows 5-8. A fourth region (Region 4) of the four regions corresponds with pixel values within the second half of pixel rows 5-8. As only Region 2, Region 3, and Region 4 include valid pixel values, the metadata code embedded within the portion of the image (e.g., embedded within a last pixel within the portion of the image or within one of the pixels within the portion of the image) includes "0111" representing that only Region 1 does not include a valid pixel value between a minimum pixel value threshold and a maximum pixel value threshold. Thus, a processor may first read the embedded metadata code in order to determine whether one or more of the four regions within the portion of the image includes valid pixel values. In this case, the processor may skip the pixel values within Region 1.

Figure 7A:
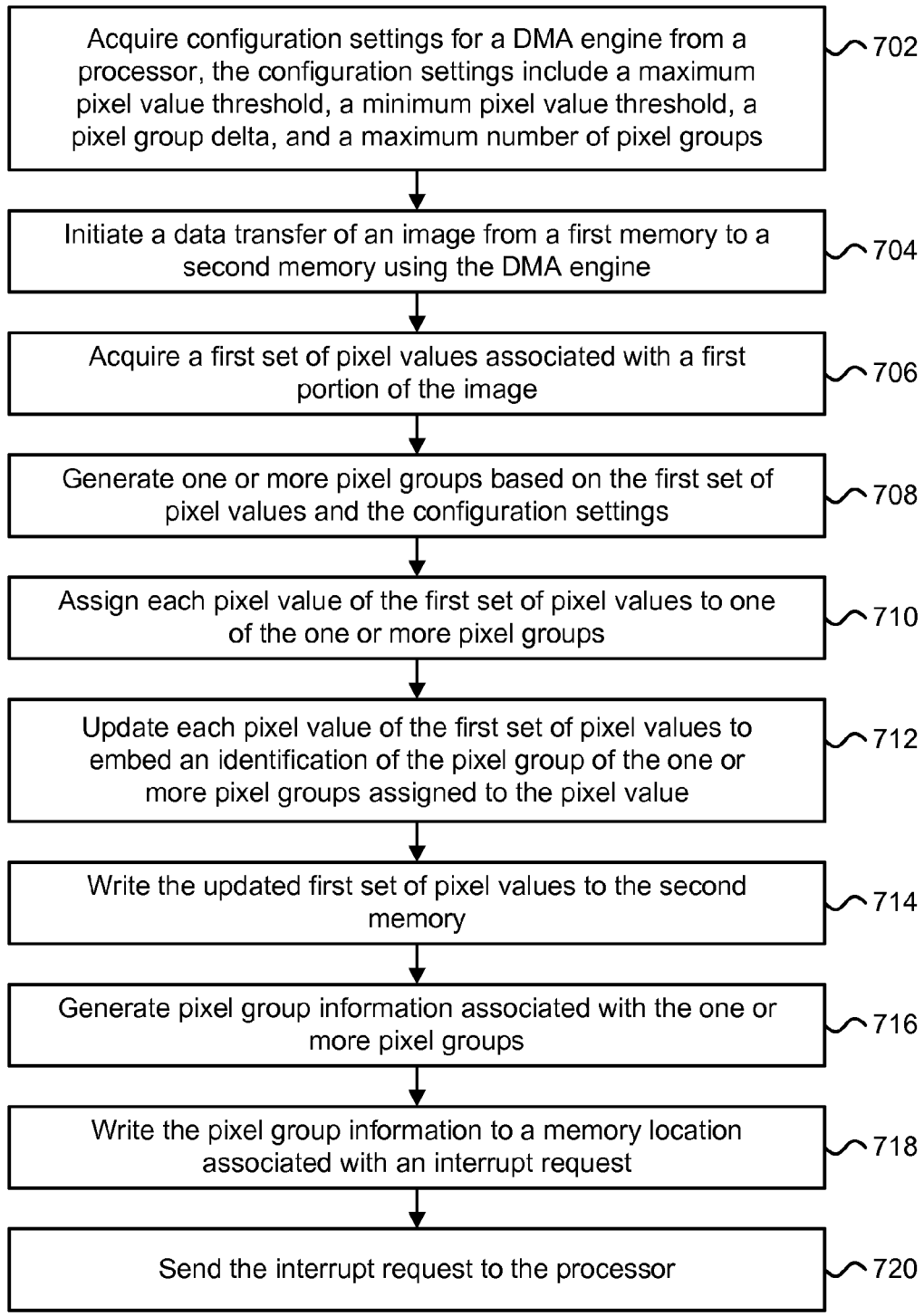
FIG. 7A is a flowchart describing one embodiment of a method for preprocessing pixel data using a DMA engine.

FIG. 7A is a flowchart describing one embodiment of a method for preprocessing pixel data using a DMA engine. In one embodiment, the process of FIG. 7A may be performed by a DMA engine, such as DMA engine 408 in FIG. 4.

In step 702, configuration settings for a DMA engine are acquired from a processor. The configuration settings may include a maximum pixel value threshold, a minimum pixel value threshold, a pixel group delta, and a maximum number of pixel groups. In step 704, a data transfer of an image from a first memory to a second memory using the DMA engine is initiated. In one embodiment, the data transfer may be initiated by the DMA engine. In another embodiment, the data transfer may be initiated by the processor and the data transfer may be controlled by the DMA engine. The data transfer may comprise a 1D data transfer (e.g., pixels associated with a row within the image may be transferred) or a 2D data transfer (e.g., pixels associated with a two-dimensional portion of the image may be transferred). The data transfer may be initiated by the processor and the data transfer may be controlled by the DMA engine. The image may comprise a depth image including depth pixel values or a color image including color pixel values. The first memory may comprise a DRAM (e.g., a DDR SDRAM) and the second memory may comprise an SRAM or a local cache accessible by the processor.

In one embodiment, the configuration settings for the DMA engine may include a maximum pixel value threshold for depth pixels, a minimum pixel value threshold for depth pixels, a maximum pixel value threshold for color pixels, and a minimum pixel value threshold for color pixels. In this case, when the DMA engine is processing pixel values associated with a depth image, then the configuration settings associated with processing depth information, such as the maximum pixel value threshold for depth pixels and the minimum pixel value threshold for depth pixels may be applied to the pixel values associated with the depth image. When the DMA engine is processing pixel values associated with a color image, then the configuration settings associated with processing color information (e.g., RGB pixel values), such as the maximum pixel value threshold for color pixels and the minimum pixel value threshold for color pixels may be applied to the pixel values associated with the color image.

In step 706, a first set of pixel values associated with a first portion of the image is acquired. In one embodiment, the first set of pixel values may correspond with a number of pixel values that may be concurrently transferred over a memory bus connecting the first memory to the second memory. In one example, the memory bus may comprise a 64-bit memory bus and the number of pixel values that may be concurrently transferred may comprise four pixel values. In another embodiment, the first set of pixel values may correspond with a row within the image. In another embodiment, the first set of pixel values may correspond with a number of pixel values that may be concurrently buffered within a memory buffer of the DMA engine. In one example, the first set of pixels may comprise 64 pixels stored within a 128 B memory buffer within the DMA engine.

In step 708, one or more pixel groups are generated based on the first set of pixel values and the configuration settings. In one embodiment, the one or more pixel groups may be generated as individual pixel values are received by the DMA engine. In another embodiment, one or more pixel groups may be generated by determining a minimum number of new pixel groupings based on a portion of the first set of pixel values stored within a memory buffer of the DMA engine. In one example, the DMA engine may concurrently store 64 pixel values or 128 pixel values. Each pixel group of the one or more pixel groups may span a range of pixel values set by the pixel group delta (e.g., plus or minus the value of the pixel group delta around a midpoint pixel value). Each pixel group of the one or more pixel groups may include pixel values between the maximum pixel value threshold and the minimum pixel value threshold. In the event that the maximum number of pixel groups is exceeded, the DMA engine may detect that an overflow condition has occurred and generate metadata to specify that the overflow condition has occurred.

In step 710, each pixel value of the first set of pixel values is assigned to one of the one or more pixel groups. In one embodiment, a pixel value may be assigned to a first pixel group of the one or more pixel groups if the pixel value is within a range of pixel values associated with the first pixel group. In step 712, each pixel value of the first set of pixel values is updated to embed an identification of the pixel group of the one or more pixel groups assigned to the pixel value. In one embodiment, a metadata label (e.g., a 4-bit metadata label) identifying a particular pixel group that has been assigned to a particular pixel may be embedded within unused bits of the particular pixel. In step 714, the updated first set of pixel values is written to the second memory.

In step 716, pixel group information associated with the one or more pixel groups is generated. In step 718, the pixel group information is written to a memory location associated with an interrupt request. The pixel group information may comprise a plurality of vectors and each vector of the plurality of vectors may include an identification of whether a particular pixel grouping is valid, whether an overflow condition has occurred for the pixel groupings, and a midpoint pixel value for the particular pixel grouping. In one example, the pixel group information may be written to the second memory in a particular location that corresponds with the interrupt request. In step 720, the interrupt request is sent to the processor. In one embodiment, the DMA engine may directly communicate the pixel group information to the processor directly, rather than writing the pixel group information to the second memory.

Figure 7B:
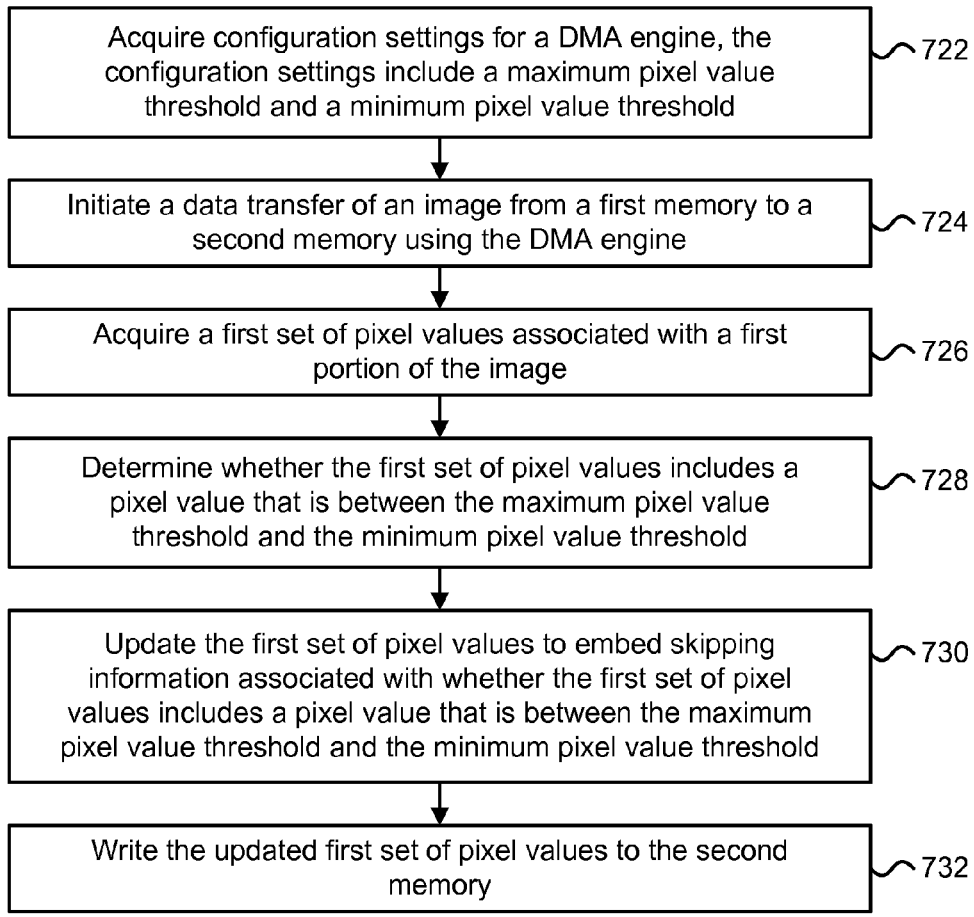
FIG. 7B is a flowchart describing an alternative embodiment of a method for preprocessing pixel data using a DMA engine.

FIG. 7B is a flowchart describing an alternative embodiment of a method for preprocessing pixel data using a DMA engine. In one embodiment, the process of FIG. 7B may be performed by a DMA engine, such as DMA engine 408 in FIG. 4.

In step 722, configuration settings for a DMA engine are acquired. The configuration settings may include a maximum pixel value threshold at a minimum pixel value threshold. In step 724, a data transfer of an image from a first memory to a second memory using the DMA engine is initiated. The data transfer may be initiated by a processor and the data transfer may be controlled by the DMA engine. The image may comprise a depth image including depth pixel values or a color image including color pixel values. The first memory may comprise a DRAM and the second memory may comprise an SRAM or a local cache accessible by the processor.

In one embodiment, the configuration settings for the DMA engine may include a maximum pixel value threshold for depth pixels, a minimum pixel value threshold for depth pixels, a maximum pixel value threshold for color pixels, and a minimum pixel value threshold for color pixels. In this case, when the DMA engine is processing pixel values associated with a depth image, then the configuration settings associated with processing depth information, such as the maximum pixel value threshold for depth pixels and the minimum pixel value threshold for depth pixels may be applied to the pixel values associated with the depth image. When the DMA engine is processing pixel values associated with a color image, then the configuration settings associated with processing color information, such as the maximum pixel value threshold for color pixels and the minimum pixel value threshold for color pixels may be applied to the pixel values associated with the color image. In some cases, different threshold pixel values may be used for different colors. For example, the configuration setting may include a maximum pixel value threshold for red colored pixels and a maximum pixel value threshold for green colored pixels.

In step 726, a first set of pixel values associated with a first portion of the image is acquired. In one embodiment, the first set of pixel values may correspond with a number of pixel values that may be concurrently transferred over a memory bus connecting the first memory to the second memory. In one example, the memory bus may comprise a 64-bit memory bus and the number of pixel values that may be concurrently transferred over the memory bus may comprise four pixel values. In another embodiment, the first set of pixel values may correspond with a row (or a portion of a row) within the image. In another embodiment, the first set of pixel values may correspond with a number of pixel values that may be concurrently buffered within a memory buffer of the DMA engine. In one example, the first set of pixels may comprise 64 pixels stored within a 128 B memory buffer within the DMA engine.

In step 728, it is determined whether the first set of pixel values includes a pixel value that is between the maximum pixel value threshold and the minimum pixel value threshold. In one embodiment, it is determined whether the first set of pixel values includes a pixel value that is greater than or equal to the minimum pixel value threshold and less than or equal to the maximum pixel value threshold. In step 730, the first set of pixel values is updated to embed skipping information associated with whether the first set of pixel values includes at least one pixel value that is between the maximum pixel value threshold and the minimum pixel value threshold. The first set of pixel values may correspond with a first set of pixels within the portion of the first image. In some cases, the skipping information may include an identification of one or more regions within the portion of the first image that include at least one valid pixel. The skipping information may include an identification of whether a particular grouping of the first set of pixels includes at least one valid pixel. In one embodiment, the skipping information may be embedded within the first set of pixel values by embedding a metadata code (e.g., a 4-bit metadata code) within a number of unused bits associated with a pixel associated with one of the first set of pixel values (e.g., the last pixel of the first set of pixels). In step 732, the updated first set of pixel values is written to the second memory. In one embodiment, the DMA engine may directly communicate the skipping information to a processor directly, rather than writing the skipping information to the second memory.

Figure 7C:
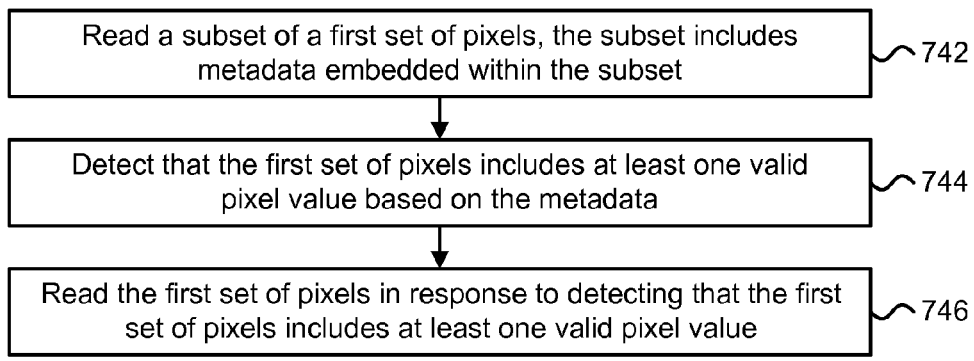
FIG. 7C is a flowchart describing one embodiment of a method for using metadata associated with preprocessed pixel data.

FIG. 7C is a flowchart describing one embodiment of a method for using metadata associated with preprocessed pixel data. In one embodiment, the process of FIG. 7C may be performed by a processor, such as processor 402 in FIG. 4.

In step 742, a subset of a first set of pixels is read. The subset of the first set of pixels may comprise one or more pixels of the first set of pixels that include embedded metadata. The embedded metadata may be embedded within unused bits of the one or more pixels. In one embodiment, the metadata may comprise pixel group labeling information. In another embodiment, the metadata may include skipping information regarding whether the first set of pixels may be skipped because the first set of pixels does not include at least one valid pixel (e.g., the first set of pixels may be skipped if the first set of pixels does not include at least one pixel with a pixel value that is greater than or equal to a minimum pixel value threshold and less than or equal to a maximum pixel value threshold). In step 744, it is detected that the first set of pixels includes at least one valid pixel value based on the metadata. In step 746, the first set of pixels is read in response to detecting that the first set of pixels includes at least one valid pixel value. In some cases, the first set of pixels may be skipped (i.e., not read) if it is detected that the first set of pixels does not include at least one valid pixel value.

In one embodiment, a processor (or image processing software running on the processor) may configure a DMA engine to generate a metadata code that includes an indication of whether a particular region within an image (e.g., a depth image or a color image) includes at least one pixel value that is within a pixel value range that has been specified by the processor. In one example, the processor may be performing an image processing operation associated with pixels that correspond with a particular depth range. In this case, the processor may configure the DMA engine to provide an indication of whether a particular region within the image includes pixel values within the particular depth range. By first reading the metadata code that includes the indication of whether the particular region within the image includes pixel values within the particular depth range, the processor may determine whether the processor needs to read the pixels associated with the particular region or whether the processor may skip over and not read the pixels associated with the particular region, thereby saving computational time and power.

One embodiment of the disclosed technology includes acquiring configuration settings for the DMA engine. The configuration settings include a maximum pixel value threshold and a minimum pixel value threshold. The method further comprises initiating a data transfer of the image from a first memory to a second memory using the DMA engine and acquiring a first set of pixels associated with a first portion of the image. The method further comprises generating one or more pixel groupings based on a first set of pixel values corresponding with the first set of pixels, the maximum pixel value threshold, and the minimum pixel value threshold. The method further comprises assigning a first pixel of the first set of pixels to a first pixel grouping of the one or more pixel grouping, updating the first pixel to embed an identification of the first pixel grouping, and writing the updated first pixel to the second memory.

In some cases, the updating the first pixel may include embedding a metadata label specifying the first pixel grouping within unused bits of the first pixel. The first pixel may be associated with a first pixel value that is not a multiple of eight bits. In some cases, the method may further comprise determining a minimum number of new pixel groupings based on the first set of pixel values and generating the one or more pixel groupings based on the minimum number of new pixel groupings.

One embodiment of the disclosed technology includes a memory and one or more processors in communication with the memory. The memory stores configuration settings for the DMA engine. The configuration settings include a maximum pixel value threshold and a minimum pixel value threshold. The one or more processors initiate a data transfer of an image from a first memory to a second memory, acquire a first set of pixels associated with a first portion of the image, generate one or more pixel groupings based on a first set of pixel values corresponding with the first set of pixels and the configuration settings, assign a first pixel of the first set of pixels to a first pixel grouping of the one or more pixel groupings, update the first pixel to embed an identification of the first pixel grouping, and write the updated first pixel to the second memory.

One embodiment of the disclosed technology includes acquiring configuration settings for the DMA engine. The configuration settings include a maximum pixel value threshold and a minimum pixel value threshold. The method further comprises initiating a data transfer of the image from a first memory to a second memory using the DMA engine, acquiring a first set of pixels associated with a first portion of the image, generating one or more pixel groupings based on a first set of pixel values corresponding with the first set of pixels and the configuration settings, assigning a first pixel of the first set of pixels to a first pixel grouping of the one or more pixel groupings, embedding a metadata label specifying the first pixel grouping within unused bits of the first pixel, and writing the first pixel to the second memory (or causing the updated first pixel to be written to the second memory).

Figure 8:
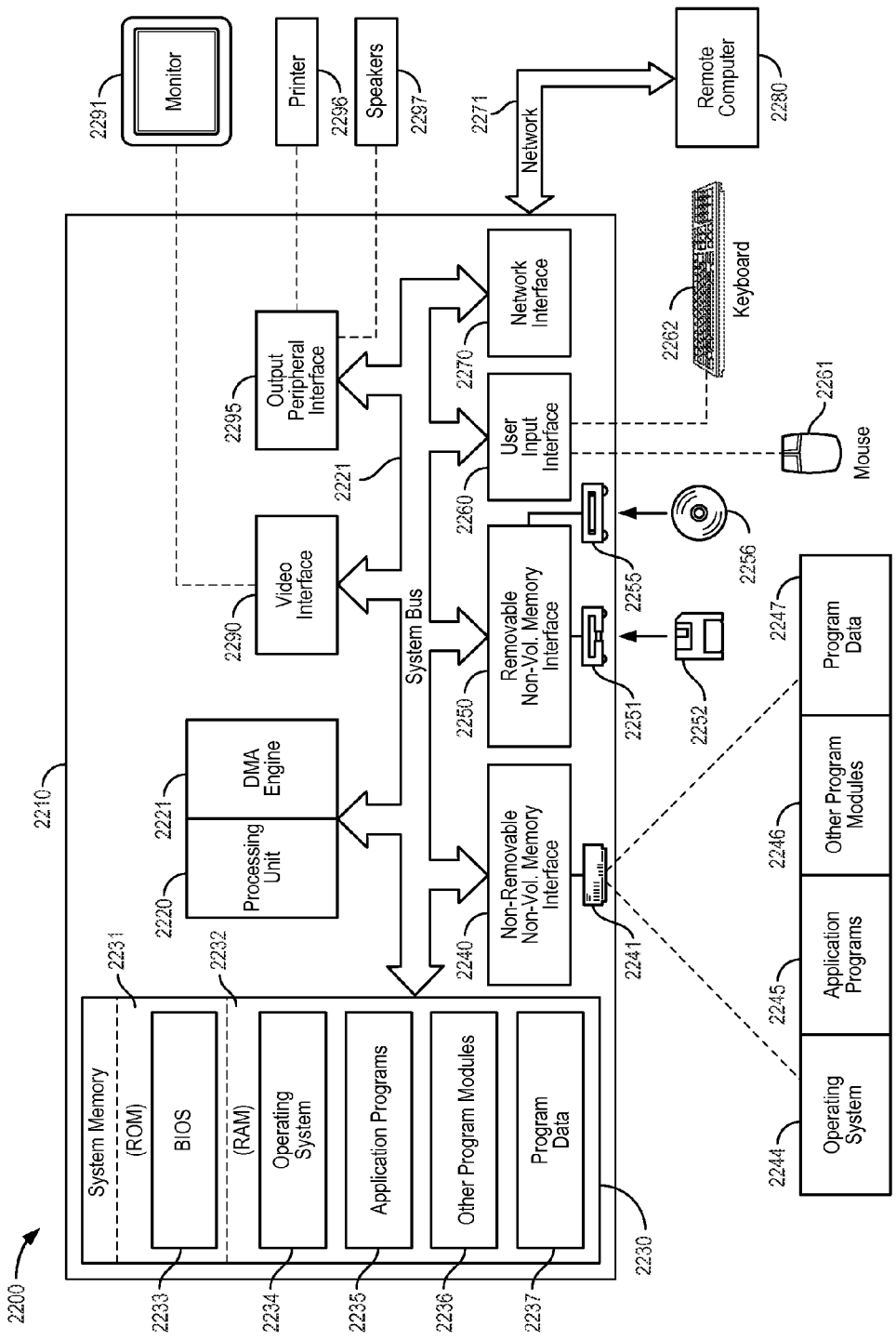
FIG. 8 depicts one embodiment of a computing system environment.

The disclosed technology may be used within various computing system environments. FIG. 8 depicts one embodiment of a computing system environment 2200. In one example, computing system environment 2200 may include one or more computing devices, such as computing device 154 in FIG. 1A. As depicted, computing system environment 2200 includes a general purpose computing device in the form of a computer 2210. Components of computer 2210 may include, but are not limited to, a processing unit 2220, a DMA engine 2221, a system memory 2230, and a system bus 2221 that couples various system components including the system memory 2230 to the processing unit 2220. The processing unit 2220 may include a local cache for storing data used by the processing unit 2220. The system bus 2221 may be any of several types of bus structures including a memory bus, a peripheral bus, or a local bus using any of a variety of bus architectures. In one example, the system bus 2221 may include a 64-bit or 128-bit memory bus.

Computer 2210 may include a variety of computer readable storage devices. The computer readable storage devices may include volatile storage devices, non-volatile storage devices, removable storage devices, and non-removable storage devices. The computer readable storage devices may be used to store computer readable instructions, data structures, program modules, and other computer readable data. The computer readable storage devices may include a random access memory (RAM), read only memory (ROM), Flash-based memory, solid-state memory, optical storage device, magnetic storage device, magnetic tape, or any other data storage device or non-transitory medium which may be used to store computer readable data.

The system memory 2230 may include ROM 2231 and RAM 2232. A basic input/output system 2233 (BIOS) containing routines for transferring information between elements within computer 2210, such as during start-up, may be stored using ROM 2231. RAM 2232 may store data and/or program modules that are accessible to processing unit 2220. The system memory 2230 may store operating system 2234, application programs 2235, other program modules 2236, and program data 2237. The computer 2210 may include a hard disk drive 2241, a magnetic disk drive 2251 that reads from or writes to a removable, nonvolatile magnetic disk 2252, and an optical disk drive 2255 that reads from or writes to a removable, nonvolatile optical disk 2256. The hard disk drive 2241 may be used to store operating system 2244, application programs 2245, other program modules 2246, and program data 2247. In some cases, the data stored on the hard disk drive 2241 may be copied to RAM 2232 and executed by the processing unit 2220. The hard disk drive 2241 may be connected to the system bus 2221 through a memory interface 2240. The magnetic disk drive 2251 and the optical disk drive 2255 may be connected to the system bus 2221 via a memory interface 2250.

An end user of the computer 2210 may enter commands and information into computer 2210 through input devices such as a keyboard 2262 and mouse 2261. Other input devices (not shown) including a microphone, pointing device, or touch pad may also be used by the end user to input data into the computer 2210. The input devices may be connected to the processing unit 2220 through a user input interface 2260 that is coupled to the system bus 2221. A monitor 2291 or other type of display device may be connected to the system bus 2221 via an interface, such as video interface 2290. Peripheral output devices such as speakers 2297 and printer 2296 may be connected to the computer 2210 via an output peripheral interface 2295. The computer 2210 may operate in a networked computing environment, such as networked computing environment 100 in FIG. 1A, and connect to a remote computer 2280 via a network 2271. The computer 2210 may connect to the network 2271 using a network interface 2270. The network 2271 may include a local area network (LAN), a wide area network (WAN), or the Internet. The remote computer 2280 may comprise a computing device, such as a personal computer, a server, or a mobile computing device.

The disclosed technology may be described in the context of computer-executable instructions, such as software or program modules, being executed by a computer or processor. The computer-executable instructions may comprise portions of computer program code, routines, programs, objects, software components, data structures, or other types of computer-related structures that may be used to perform processes using a computer. In some cases, hardware or combinations of hardware and software may be substituted for software or used in place of software.

Computer program code used for implementing various operations or aspects of the disclosed technology may be developed using one or more programming languages, including an object oriented programming language such as Java or C++, a procedural programming language such as the "C" programming language or Visual Basic, or a dynamic programming language such as Python or JavaScript. In some cases, computer program code or machine-level instructions derived from the computer program code may execute entirely on an end user's computer, partly on an end user's computer, partly on an end user's computer and partly on a remote computer, or entirely on a remote computer or server.

For purposes of this document, it should be noted that the dimensions of the various features depicted in the Figures may not necessarily be drawn to scale.

For purposes of this document, reference in the specification to "an embodiment," "one embodiment," "some embodiments," or "another embodiment" may be used to describe different embodiments and do not necessarily refer to the same embodiment.

For purposes of this document, a connection may be a direct connection or an indirect connection (e.g., via another part). In some cases, when an element is referred to as being connected or coupled to another element, the element may be directly connected to the other element or indirectly connected to the other element via intervening elements. When an element is referred to as being directly connected to another element, then there are no intervening elements between the element and the other element.

For purposes of this document, the term "based on" may be read as "based at least in part on."

For purposes of this document, without additional context, use of numerical terms such as a "first" object, a "second" object, and a "third" object may not imply an ordering of objects, but may instead be used for identification purposes to identify different objects.

For purposes of this document, the term "set" of objects may refer to a "set" of one or more of the objects.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method for processing an image using a direct memory access engine, comprising:
    acquiring configuration settings for the direct memory access engine, the configuration settings include a maximum pixel value threshold and a minimum pixel value threshold;
    initiating a data transfer of the image from a first memory to a second memory using the direct memory access engine;
    acquiring a first set of pixels associated with a first portion of the image, the first set of pixels includes a first pixel and a second pixel;
    generating a metadata label using a first set of pixel values corresponding with the first set of pixels;
    updating the first pixel to embed the metadata label within unused bits of the first pixel while the image is transferred from the first memory to the second memory using the direct memory access engine such that the first pixel includes both the metadata label and a first pixel value corresponding with the first pixel in response to detecting that the first set of pixels includes a pixel value between the maximum pixel value threshold and the minimum pixel value threshold; and
    writing the first pixel to the second memory subsequent to embedding the metadata label within the unused bits of the first pixel.

2. The method of claim 1, wherein:
the first pixel corresponds with a first row of the image and the second pixel corresponds with a second row of the image different from the first row; and the first pixel value corresponding with the first pixel is not updated while the image is transferred from the first memory to the second memory.

3. The method of claim 1, wherein:
the first pixel value is not a multiple of eight bits.

4. The method of claim 1, wherein:
the image comprises a depth image.

5. The method of claim 1, wherein:
the image comprises a depth image, the configuration settings include a maximum pixel value threshold for depth pixels and a minimum pixel value threshold for depth pixels.

6. The method of claim 5, wherein:
the maximum pixel value threshold for depth pixels corresponds with a first distance from a capture device used for generating the depth image and the minimum pixel value threshold for depth pixels corresponds with a second distance from the capture device that is less than the first distance.

7. The method of claim 1, wherein:
the image comprises a color image.

8. The method of claim 1, wherein:
the first memory comprises a DRAM and the second memory comprises an SRAM.

9. The method of claim 1, wherein:
unused bits of the second pixel are not updated while the image is transferred from the first memory to the second memory using the direct memory access engine.

10. The method of claim 1, wherein:
the configuration settings include a maximum number of pixel groupings.

11. The method of claim 1, wherein:
the first set of pixels corresponds with a plurality of pixels that are concurrently transferred over a memory bus connecting the first memory to the second memory.

12. The method of claim 1, wherein:
the first set of pixels corresponds with a maximum number of pixels that may be concurrently buffered within a memory buffer of the direct memory access engine.

13. The method of claim 1, further comprising:
determining a minimum number of new pixel groupings based on the first set of pixel values corresponding with the first set of pixels; and
generating one or more pixel groupings based on the minimum number of new pixel groupings.

14. A direct memory access engine, comprising:
a memory configured to store configuration settings for the direct memory access engine, the configuration settings include a maximum pixel value threshold and a minimum pixel value threshold; and
one or more processors in communication with the memory, the one or more processors configured to initiate a data transfer of an image from a first memory to a second memory and acquire a first set of pixels associated with a first portion of the image, the first set of pixels includes a first pixel and a second pixel, the one or more processors configured to update the first pixel to embed a metadata label within unused bits of the first pixel while the image is transferred from the first memory to the second memory such that the first pixel includes both the metadata label and a first pixel value corresponding with the first pixel in response to detecting that the first set of pixels includes a pixel value between the maximum pixel value threshold and the minimum pixel value threshold.

15. The direct memory access engine of claim 14, wherein:
  the first pixel corresponds with a first row of the image and the second pixel corresponds with a second row of the image different from the first row; and
  the first pixel value corresponding with the first pixel is not updated while the image is transferred from the first memory to the second memory.

16. The direct memory access engine of claim 14, wherein:
  the image comprises a depth image.

17. The direct memory access engine of claim 14, wherein:
  the first memory comprises a DRAM and the second memory comprises an SRAM.

18. The direct memory access engine of claim 14, wherein:
  unused bits of the second pixel are not updated while the image is transferred from the first memory to the second memory.

19. One or more storage devices containing processor readable code for programming one or more processors to perform a method for processing an image using a direct memory access engine comprising:
  acquiring configuration settings for the direct memory access engine, the configuration settings include a maximum pixel value threshold and a minimum pixel value threshold;
  initiating a data transfer of the image from a first memory to a second memory using the direct memory access engine;
  acquiring a first set of pixels associated with a first portion of the image, the first set of pixels includes a first pixel and a second pixel;
  embedding a metadata label within unused bits of the first pixel while the image is transferred from the first memory to the second memory using the direct memory access engine such that the first pixel includes both the metadata label and a first pixel value corresponding with the first pixel in response to detecting that the first set of pixels includes a pixel value between the maximum pixel value threshold and the minimum pixel value threshold; and
  writing the first pixel to the second memory subsequent to embedding the metadata label within the unused bits of the first pixel.

20. The one or more storage devices of claim 19, wherein:
  the first pixel corresponds with a first row of the image and the second pixel corresponds with a second row of the image different from the first row; and
  the first pixel value corresponding with the first pixel is not updated while the image is transferred from the first memory to the second memory.

* * * * *